(12) United States Patent
Kellner et al.

(10) Patent No.: US 10,384,725 B2
(45) Date of Patent: Aug. 20, 2019

(54) MOTOR VEHICLE BODY ASSEMBLY

(71) Applicant: Dr. Ing. h.c. F. Porsche AG, Stuttgart (DE)

(72) Inventors: Philipp Kellner, Weil der Stadt (DE); Ralph Renz, Sindelfingen (DE); Frank Haeusler, Zerbst/Anhalt (DE); Sophie Kerchnawe, Leipzig (DE); Olaf Taeger, Braunschweig (DE)

(73) Assignee: DR. ING. H.C. F. PORSCHE AG, Stuttgart (DE)

( * ) Notice: Subject to any disclaimer, the term of this patent is extended or adjusted under 35 U.S.C. 154(b) by 0 days.

(21) Appl. No.: 15/811,761

(22) Filed: Nov. 14, 2017

(65) Prior Publication Data

US 2018/0141590 A1 May 24, 2018

(30) Foreign Application Priority Data

Nov. 18, 2016 (DE) .................. 10 2016 222 718

(51) Int. Cl.
*B62D 25/20* (2006.01)
*B62D 27/02* (2006.01)
*B62D 29/00* (2006.01)

(52) U.S. Cl.
CPC .......... *B62D 25/20* (2013.01); *B62D 27/023* (2013.01); *B62D 29/005* (2013.01)

(58) Field of Classification Search
CPC ..... B62D 25/20; B62D 27/023; B62D 29/005
USPC .......................................... 296/193.07, 204
See application file for complete search history.

(56) References Cited

U.S. PATENT DOCUMENTS 5,271,650 A * 12/1993 Fukuhara ............... B60R 19/18
                                                           293/120
6,015,183 A *  1/2000 Vlahovic ............... B62D 25/20
                                                           296/204
2001/0036559 A1  11/2001 Haack et al.
(Continued)

FOREIGN PATENT DOCUMENTS

DE           3818478 C2    4/1993
DE         10002642 A1    8/2001
(Continued)

*Primary Examiner* — Joseph D. Pape
(74) *Attorney, Agent, or Firm* — Leydig, Voit & Mayer, Ltd.

(57) ABSTRACT

A motor vehicle body assembly includes a composite structural component having a connection flange, and a metallic body component or functional group having a connection flange. The connection flange of the composite structural component and the connection flange of the metallic body component or functional group bear on one another and extend substantially across a preferred connection flange direction. The composite structural component has at least one carbon fiber-plastics composite tier having a thermal expansion behavior that in the fiber direction is almost temperature-neutral, and at least one fiber-plastics composite tier having a thermal expansion behavior similar to that of metal. The carbon fibers of the carbon fiber-plastics composite tier in relation to the preferred connection flange direction enclose an angle a=30 to 60°, and the fibers of the fiber-plastics composite tier in relation to the preferred connection flange direction enclose an angle b=0 to 30°.

20 Claims, 2 Drawing Sheets

(56) References Cited

U.S. PATENT DOCUMENTS

| | | | |
|---|---|---|---|
| 2003/0134090 A1* | 7/2003 | Tate | B62D 29/001 428/174 |
| 2008/0296164 A1* | 12/2008 | Dajek | B62D 29/002 205/80 |
| 2013/0076069 A1* | 3/2013 | Fuchs | B62D 21/02 296/181.2 |
| 2014/0170342 A1* | 6/2014 | Peitz | B62D 29/005 428/34.1 |
| 2015/0251699 A1* | 9/2015 | Oh | B62D 25/20 296/187.08 |
| 2016/0362054 A1* | 12/2016 | Kerscher | B60R 9/04 |
| 2017/0080985 A1* | 3/2017 | Wilhelm | B62D 27/065 |

FOREIGN PATENT DOCUMENTS

| | | |
|---|---|---|
| DE | 102005033351 A1 | 1/2007 |
| EP | 1391369 A2 | 2/2004 |

\* cited by examiner

MOTOR VEHICLE BODY ASSEMBLY

CROSS REFERENCE TO RELATED APPLICATIONS

This application claims benefit to German Patent Application No. DE 10 2016 222 718.1, filed Nov. 18, 2016, which is hereby incorporated by reference herein.

FIELD

The invention relates to a motor vehicle body assembly.

BACKGROUND

In the modern-day development of motor vehicles the development engineers strive to design as lightweight a motor vehicle as possible and, on account thereof, to reduce fuel consumption and environmental stress and to improve the handling of the vehicle on the road. The lightweight construction mode herein is, for example, implemented in that fiber-plastics composites are increasingly employed and, on account thereof, the weight of the motor vehicle is reduced by virtue of the density that is low in comparison to aluminum and in particular to steel.

A vehicle body is composed from a mixture of fiber-plastics composites and metallic body components, for example, wherein the fiber-plastics composites are connected to the metallic body components by screw or rivet connections, for example. Problematic in the case of such a hybrid lightweight construction of the vehicle body are the dissimilar thermal expansion behaviors of the various material groups. For example, problems arise in painting or in the subsequent drying procedure, respectively, which is performed at highest possible temperatures of 130° to 220°, for example, so as to complete the drying of the paintwork as rapidly as possible. On account of the dissimilar thermal expansion rates of the body components that arise in particular in the drying process, high mechanical stresses are created in the body components and in particular in the join connections, said mechanical stresses potentially leading to deformations and in the extreme to a breakage of the body component and/or of the join connections.

In order for the hybrid lightweight construction of the motor vehicle body from fiber-plastics composites and metallic body components to nevertheless be possible, it is known from the prior art for the fiber-plastics composites and the metallic body components in the non-assembled state to be painted separately and to be joined together thereafter. This variant leads to additional costs and increases the complexity of painting and assembling.

Another solution that is known from the prior art for avoiding stress loads by virtue of dissimilar thermal expansion behavior is to adapt the coefficient of thermal expansion of the fiber-plastics composite to the coefficient of thermal expansion of the metallic body component. EP 1 391 369 A2, for example, discloses a metallic body component and a body component that is embodied from a fiber-plastics composite, said components being interconnected by way of an adhesive connection. The fiber-plastics composite in the flange region herein is embodied in such a manner that the thermal expansion behavior of the fiber-plastics composite corresponds to the thermal expansion behavior of the metallic body component. The adaptation of the coefficient of thermal expansion of the fiber-plastics composite to the coefficient of thermal expansion of the metallic body component is performed by the orientation of the fibers that are embedded in a thermoplastic matrix, wherein the fibers in the flange region in relation to an orthogonal that is oriented so as to be perpendicular to the preferred direction of the flange region enclose an angle $a=+/-10$ to $30°$.

It is disadvantageous in the case of the embodiment disclosed in EP 1 391 369 A2 that the fiber-plastics composite in the flange region, on account of the respective orientation of the fibers for adapting the coefficient of thermal expansion to the coefficient of thermal expansion of the metallic body component, leads to a reduction in the strength of the fiber-plastics composite.

SUMMARY

In an embodiment, the present invention provides a motor vehicle body assembly. The motor vehicle body assembly includes a composite structural component having a connection flange, and a metallic body component or functional group having a connection flange. The connection flange of the composite structural component and the connection flange of the metallic body component or functional group bear on one another and extend substantially across a preferred connection flange direction. The composite structural component has at least one carbon fiber-plastics composite tier having a thermal expansion behavior that in the fiber direction is almost temperature-neutral, and at least one fiber-plastics composite tier having a thermal expansion behavior similar to that of metal. The carbon fibers of the carbon fiber-plastics composite tier in relation to the preferred connection flange direction enclose an angle $a=30$ to $60°$, and the fibers of the fiber-plastics composite tier in relation to the preferred connection flange direction enclose an angle $b=0$ to $30°$.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
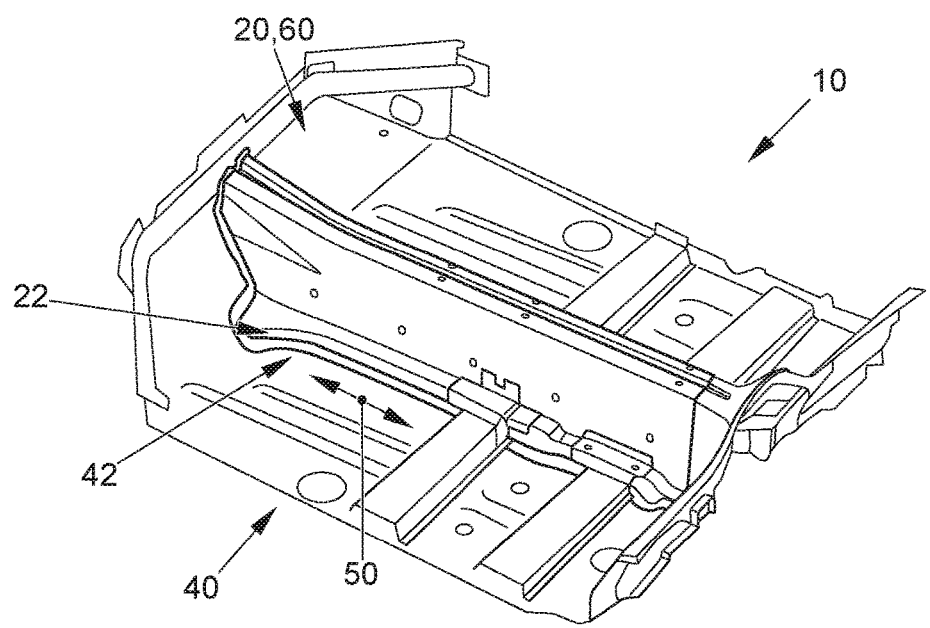
FIG. 1 shows a perspective illustration of a motor vehicle body assembly.

Embodiments of the invention provide a motor vehicle body assembly which is of high strength and in the case of high temperatures is not damaged by the thermal expansion of the body components.

A motor vehicle body assembly according to embodiments of the invention has a composite structural component and a metallic body component. The composite structural component and the metallic body component are interconnected by way of connection flanges that in each case are configured on the composite structural component and on the metallic body component, wherein the connection flanges extend in a preferred connection flange direction and are interconnected by way of a screw or rivet connection, for example. In the case of an elongate body component, the preferred connection flange direction is the longitudinal direction, for example.

The composite structural component has at least one carbon fiber-plastics composite tier having a temperature-neutral thermal expansion behavior, and at least one fiber-plastics composite tier having a thermal expansion behavior similar to that of metal, wherein the carbon fibers of the carbon fiber-plastics composite tier in relation to the preferred connection flange direction enclose an angle a=30 to 60°, and the fibers of the carbon fiber-plastics composite tier in relation to the preferred connection flange direction enclose an angle b=0 to 30°.

The thermal expansion behavior of the fiber-plastics composite tier that is similar to that of metal can correspond to the thermal expansion behavior of aluminum or to the thermal expansion behavior of steel, for example, or be similar to the latter, wherein the coefficient of thermal expansion of the fiber-plastics composite tier corresponds to the coefficient of thermal expansion of aluminum ($23 \times 10^{-6}$/K) or of steel ($11\text{-}12 \times 10^{-6}$/K), respectively, or approximates the latter. The temperature-neutral thermal expansion behavior of the carbon fiber-plastics composite tier has almost no thermal expansion in the case of elevated temperatures.

On account of an orientation of the fibers of the carbon fiber-plastics composite tier in this manner, and on account of the combination with a fiber-plastics composite tier, the composite structural component has an elastic deformation behavior of such a type that the intense thermal expansion of the metallic body component that arises at a high temperature can be sustained without damage by the composite structural component. Moreover, the composite structural component, in particular by virtue of the embedded carbon fibers, is of high strength and rigidity.

In one or more embodiments, the composite structural component has a thermoplastic matrix. As opposed to a matrix produced from a thermoset material, the thermoplastic matrix is capable of refusing. Depending on the temperature, thermoplastics herein can be present in an energy-elastic, thermo-elastic, or thermo-plastic state. The thermoplastics in the case of room temperature or of low temperatures are present in the energy-elastic state and if at all are deformable only with difficulty. The thermoplastics in the thermo-elastic state are slightly deformable in an elastic manner. The thermoplastics in the case of high temperatures are present in the thermo-plastic state and can be plastically deformed, for example for shaping the component. In this way, thermoplastics in the case of an elevated temperature, for example in the drying process of paintwork, can be slightly deformed in an elastic manner, on account of which the thermal expansion of the metallic body component can be readily absorbed and tolerated.

The fiber-plastics composite tier is preferably embodied having glass fibers. The glass fiber-reinforced plastics have a thermal expansion behavior that is similar to that of metal and therefore can be readily joined to metals. Alternatively basalt or aramid fibers can also be employed.

In one or more embodiments, the carbon fiber-plastics composite tier and the fiber-plastics composite tier are both embodied having endless fibers, wherein the fiber-plastics composites having embedded endless fibers are of a rigidity and strength that is high in comparison to that of fiber-plastics composites having short or long fibers.

The fibers of the carbon fiber-plastics composite tier and/or of the fiber-plastics composite tier are preferably embodied as cross-laid structures, woven fabrics, or braided fabrics, on account of which the internal rigidity and strength of a fiber-plastics composite is increased.

In one or more embodiments, the peripheral region of the composite structural component is bordered by a short fiber- or long fiber-reinforced plastics edging. Caron fibers that are embedded in the matrix cause crevice corrosion on metallic components. In order for crevice corrosion to be avoided in a simple manner, the peripheral region of the composite structural component is bordered by the short or long fiber-reinforced plastics edging, wherein the short or long fibers are preferably glass fibers.

The metallic body component is preferably produced from aluminum, on account of which the weight of the motor vehicle body is reduced.

In one or more embodiments, the composite structural component is produced from one or a plurality of carbon fiber-plastics composite tiers and at least two fiber-plastics composite tiers, wherein the carbon fiber-plastics composite tiers are disposed between the fiber-plastics composite tiers. All carbon fiber-plastics composite tiers and fiber-plastics composite tiers are present as woven fabric, cross-laid structures, braided fabrics, or as a combination thereof, for example, and are embedded in a single thermoplastic matrix. A high strength and rigidity of the composite structural component is achieved on account of a tiered construction of this type. Moreover, the crevice corrosion of the metallic body components that are adjacent to the composite structural component is precluded on account of the arrangement of the carbon fiber-plastics composite tiers between the two fiber-plastics composite tiers, in that any contact between the carbon fiber-plastics composite tiers and the metallic body components is prevented.

The first composite structural component for the reinforcement of strength and rigidity preferably has a second composite structural component. The second composite structural component herein is fixedly connected to the first composite structural component and serves for increasing the stress loads that can be sustained by the composite structural component. The second composite structural component preferably has a tier structure that is different from that of the first composite structural component. The tier structure of the second composite structural component can be embodied in such a manner that the carbon fiber-plastics composite tier has fibers which are largely oriented in the preferred connection flange direction, for example, on account thereof increasing the sustainable stress load on the composite structural component in the preferred connection flange direction. The tolerance in terms of dissimilar coefficients of thermal expansion herein is achieved in that the second composite structural component is connected only to the first composite structural component but not to the metallic body components.

In one or more embodiments, the composite structural component for reinforcement has a rib structure, on account of which the rigidity of the composite structural component is much increased.

The composite structural component for reinforcement preferably has at least one reinforcement panel from metal. In this way, local highly stressed regions of the composite structural component can be reinforced.

In one or more embodiments, the composite structural component is a vehicle transmission tunnel, wherein the transmission tunnel contributes toward flexural and torsional rigidity and in the event of a front-end or rear-end collision, respectively, conjointly with the longitudinal chassis beams and the side sills of the body serves as the major longitudinal stress absorber.

FIG. 1 shows a perspective illustration of a motor vehicle body assembly 10. The motor vehicle body assembly 10 has a composite structural component 20 and a metallic body functional group 40. The composite structural component 20 is embodied as a transmission tunnel 60 of a motor vehicle body and has a connection flange 22. The composite structural component 20 by way of the connection flange 22 is connected to a connection flange 42 that is configured on the metallic body functional group 40. The connection flanges 22, 42 extend in a preferred connection flange direction 50 which corresponds to the longitudinal direction of the transmission tunnel 60.

Figure 2:
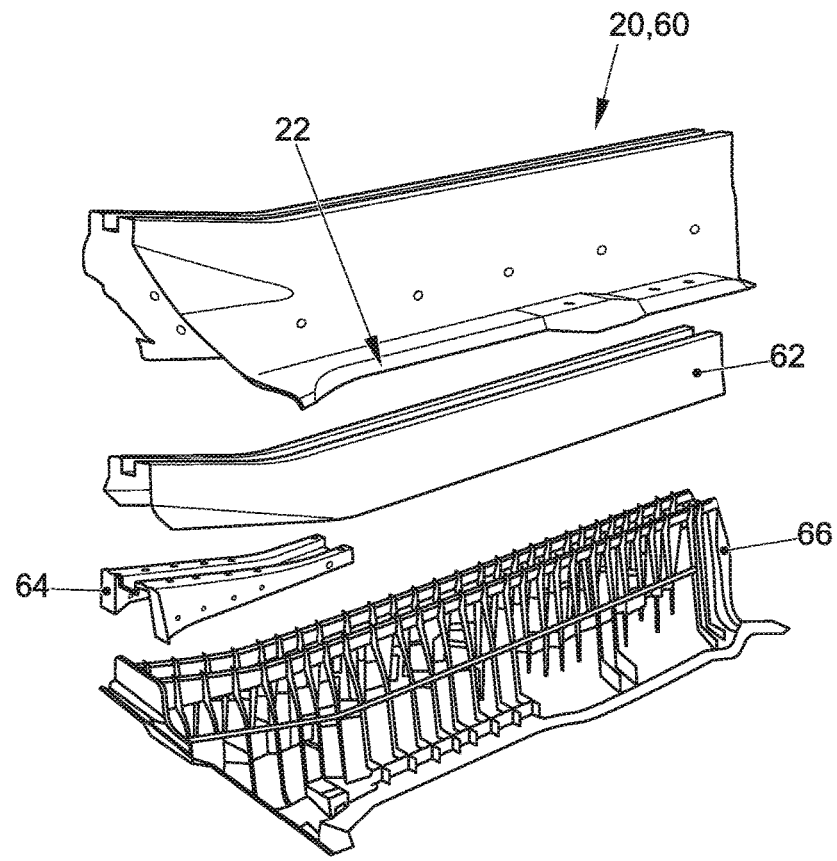
FIG. 2 shows an exploded illustration of a composite structural component of the motor vehicle body assembly of FIG. 1.

FIG. 2 shows the transmission tunnel 60 that is produced from the composite structural component 20, wherein the transmission tunnel 60 additionally has a second composite structural component 62, a reinforcement panel 64, and a rib structure 66. The second composite structural component 62 is embodied so as to be elongate and is disposed in the interior of the transmission tunnel 60, wherein the second composite structural component 62 in terms of strength and rigidity reinforces the transmission tunnel 60 across the entire length. The reinforcement panel 64 is disposed on an axial end of the transmission tunnel 60 and in a localized manner reinforces the strength of a highly stressed region of the transmission tunnel 60. The rib structure 66 is embodied from a fiber-composite plastics and serves for reinforcing the rigidity of the transmission tunnel 60, wherein the rib structure 66 is disposed in the interior of the transmission tunnel 60.

Figure 3:
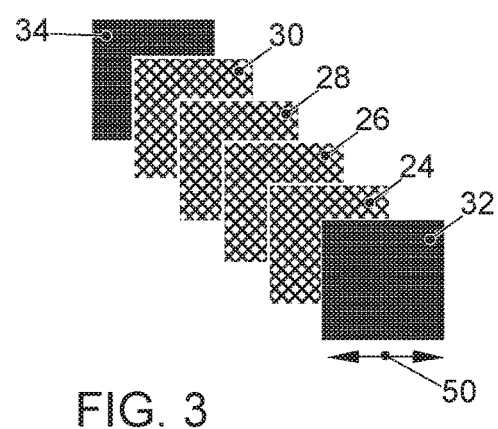
FIG. 3 shows a schematic illustration of a tiered construction of a composite structural component of the motor vehicle body assembly of FIG. 1.

FIG. 3 shows a design embodiment of the composite structural component 20, or of the transmission tunnel 60, respectively, according to the invention. The transmission tunnel 60 has four carbon fiber-plastics composite tiers 24, 26, 28, 30 and two fiber-plastics composite tiers 32, 34, wherein the carbon fiber-plastics composite tiers 24, 26, 28, 30 are disposed between the two fiber-plastics composite tiers 32, 34.

The carbon fiber-plastics composite tiers 24, 26, 28, 30 are embodied as endless fibers which as a woven fabric or a cross-laid structure are embedded in a thermoplastic matrix. The carbon fibers herein are oriented in such a manner that said carbon fibers in relation to the preferred connection flange direction 50 enclose an angle a=30 to 60°.

The fiber-plastics composite tiers 32, 34 are embodied having glass fibers and as endless fibers, and are embedded in the thermoplastic matrix as a woven fabric or a cross-laid structure. The glass fibers herein are oriented in such a manner that said glass fibers in relation to the preferred connection flange direction 50 enclose an angle b=0 to 30°.

On account of a tiered construction of the composite structural component 20 in such a manner, of an orientation of the carbon fibers and glass fibers in such a manner, and of the thermoplastic matrix, the thermal expansion of the metallic body component 40 can be absorbed without damage by the composite structural component 20, in that the composite structural component 20 by way of a primarily elastic deformation adapts to the thermal expansion of the metallic body component 40 that is caused by being heated. Additionally, crevice corrosion is avoided by the carbon fiber-plastics composite tiers being enclosed by the fiber-plastics composite tiers.

Constructive embodiments other than the embodiments described and which are within the scope of protection of the main claim are also possible. For example, the material of the metallic body component 40, the constructive design embodiment of the composite structural component 20, or the tiered construction of the composite structural component 20 can be embodied in a different manner.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A motor vehicle body assembly comprising:
    a composite structural component having a connection flange, and
    a metallic body component or functional group having a connection flange,
    wherein the connection flange of the composite structural component and the connection flange of the metallic body component or functional group bear on one another and extend substantially across a preferred connection flange direction,
    wherein the composite structural component has at least one carbon fiber-plastics composite tier having a thermal expansion behavior that in the fiber direction is almost temperature-neutral, and at least one fiber-plastics composite tier having a thermal expansion behavior similar to that of metal,
    wherein the carbon fibers of the carbon fiber-plastics composite tier in relation to the preferred connection flange direction enclose an angle a=30 to 60°, and
    wherein the fibers of the fiber-plastics composite tier in relation to the preferred connection flange direction enclose an angle b=0 to 30°.

2. The motor vehicle body assembly as claimed in claim 1, wherein the composite structural component has a thermoplastic matrix.

3. The motor vehicle body assembly as claimed in claim 1, wherein the fiber-plastics composite tier has glass fibers.

4. The motor vehicle body assembly as claimed in claim 1, wherein the carbon fiber-plastics composite tier and the fiber-plastics composite tier both have endless fibers.

5. The motor vehicle body assembly as claimed in claim 1, wherein the fibers of the carbon fiber-plastics composite tier and/or of the fiber-plastics composite tier are cross-laid structures, woven fabrics, or braided fabrics.

6. The motor vehicle body assembly as claimed in claim 1, wherein the peripheral region of the composite structural component is bordered by a short fiber- or long fiber-reinforced plastics edging.

7. The motor vehicle body assembly as claimed in claim 1, wherein the metallic body component or the metallic body functional group is produced from aluminum.

8. The motor vehicle body assembly as claimed in claim 1, wherein the composite structural component is produced from one or a plurality of carbon fiber-plastics composite tiers and at least two fiber-plastics composite tiers, wherein the carbon fiber-plastics composite tiers are disposed between the fiber-plastics composite tiers.

9. The motor vehicle body assembly as claimed in claim 1, wherein the composite structural component is a first composite structural component, and wherein the motor vehicle body assembly, for the reinforcement of strength and rigidity, has a second composite structural component.

10. The motor vehicle body assembly as claimed in claim 9, wherein the second composite structural component has a tier structure that is different from that of the first composite structural component.

11. The motor vehicle body assembly as claimed in claim 1, wherein the composite structural component has a rib structure.

12. The motor vehicle body assembly as claimed in claim 1, wherein the composite structural component has at least one reinforcement panel made of metal.

13. The motor vehicle body assembly as claimed in claim 1, wherein the composite structural component is a vehicle transmission tunnel.

14. A motor vehicle body assembly comprising:
a composite structural component having a connection flange, and
a metallic body component or functional group,
wherein the composite structural component is connected to the metallic body component or functional group by way of the connection flange,
wherein the connection flange has a width and a length, the length extending in a preferred connection flange direction,
wherein the connection flange has at least one carbon fiber-plastics composite layer having a first coefficient of thermal expansion and at least one fiber-plastics composite layer having a second coefficient of thermal expansion greater than the first coefficient of thermal expansion,
wherein the carbon fibers of the at least one carbon fiber-plastics composite layer form an angle a=30 to 60° relative to the preferred connection flange direction, and
wherein the fibers of the at least one fiber-plastics composite layer form an angle b=0 to 30° relative to the preferred connection flange direction.

15. The motor vehicle body assembly according to claim 14, wherein the at least one fiber-plastics composite layer is disposed between the metallic body component or functional group and the at least one carbon fiber-plastics composite layer such that the carbon-fiber plastics composite layer does not contact the metallic body component or functional group.

16. The motor vehicle body assembly according to claim 15, wherein the at least one fiber-plastics composite layer, which is disposed between the metallic body component or functional group and the at least one carbon fiber-plastics composite layer, is one of a woven fabric layer, a braided fabric layer, or a combination thereof.

17. The motor vehicle body assembly according to claim 14, wherein the least one fiber-plastics composite layer includes a first fiber-plastics composite layer and a second fiber-plastics composite layer, and
wherein the at least one carbon fiber-plastics composite layer is disposed between the first fiber-plastics composite layer and the second fiber-plastics composite layer.

18. The motor vehicle body assembly according to claim 17, wherein the at least one carbon fiber-plastics composite layer includes a plurality of carbon fiber-plastics composite layers.

19. The motor vehicle body assembly according to claim 17, wherein the first fiber-plastics composite layer and the second fiber-plastics composite layer are both one of a woven fabric layer, a braided fabric layer, or a combination thereof.

20. The motor vehicle body assembly according to claim 17, wherein the at least one carbon fiber-plastics composite layer is enclosed by the first fiber-plastics composite layer and the second fiber-plastics composite layer.

* * * * *